United States Patent
Tanji

(10) Patent No.: US 9,530,173 B2
(45) Date of Patent: Dec. 27, 2016

(54) INFORMATION PROCESSING DEVICE, IMAGING DEVICE, AND INFORMATION PROCESSING METHOD

(71) Applicant: Sony Corporation, Tokyo (JP)

(72) Inventor: Ichiro Tanji, Kanagawa (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 14/070,259

(22) Filed: Nov. 1, 2013

(65) Prior Publication Data

US 2014/0125832 A1 May 8, 2014

(30) Foreign Application Priority Data

Nov. 8, 2012 (JP) ................................. 2012-246191

(51) Int. Cl.
| | |
|---|---|
| *H04L 12/50* | (2006.01) |
| *G06T 1/20* | (2006.01) |
| *H04N 5/12* | (2006.01) |
| *H04N 7/12* | (2006.01) |

(52) U.S. Cl.
CPC ................ *G06T 1/20* (2013.01); *H04N 5/126* (2013.01); *H04N 7/12* (2013.01)

(58) Field of Classification Search
CPC .............. G06T 1/20; H04N 5/126; H04N 7/12
USPC ....................................................... 370/366
See application file for complete search history.

(56) References Cited

U.S. PATENT DOCUMENTS

| 9,060,126 B2* | 6/2015 | Mabuchi | ................ H04N 3/155 |
| 2005/0062864 A1* | 3/2005 | Mabuchi | ................ H04N 3/155 |
| | | | 348/294 |
| 2007/0121771 A1* | 5/2007 | Yamada | .................... G06F 1/04 |
| | | | 375/362 |
| 2012/0287942 A1* | 11/2012 | Peng | ...................... G09G 5/006 |
| | | | 370/465 |

FOREIGN PATENT DOCUMENTS

JP 2011-259332 A 12/2011

* cited by examiner

*Primary Examiner* — Peter Cheng
(74) *Attorney, Agent, or Firm* — Chip Law Group

(57) ABSTRACT

There is provided an information processing device including N first clock conversion units (N is an integer) that convert image data as parallel data into image data having a specific clock cycle, a serial conversion unit that converts N pieces of the converted image data into one-system serial data and outputs the converted data, a parallel conversion unit to which the converted image data is input and that converts the data into N pieces of parallel data having a predetermined number of bits, a synchronized data generation unit that generates synchronized data of the image data, and N second clock conversion units that reconvert the N pieces of converted image data to an original clock cycle from the specific clock cycle and set the clock cycle of the converted image data to be in a phase in synchronization with the synchronized data generated by the synchronized data generation unit.

7 Claims, 9 Drawing Sheets

INFORMATION PROCESSING DEVICE, IMAGING DEVICE, AND INFORMATION PROCESSING METHOD

CROSS REFERENCE TO RELATED APPLICATIONS

This application claims the benefit of Japanese Priority Patent Application JP 2012-246191 filed Nov. 8, 2012, the entire contents of which are incorporated herein by reference.

BACKGROUND

The present disclosure relates to an information processing device and an imaging device which output image data, and an information processing method applied to the information processing device.

Image data treated in information processing devices such as imaging devices tends to have an increasing number of pixels as resolution becomes higher. As an imaging device, for example, an imaging device that can capture images which have image resolution of one frame indicated by the number of horizontal pixels×the number of vertical lines of about 4000×about 2000, which is so-called 4K resolution or 4K2K resolution, has been developed.

Image data of 4K resolution has about 4 times as many pixels in one frame as image data of an HD (High Definition) format of the related art. For this reason, when the image data of 4K resolution (hereinafter referred to as "4K image data") is transmitted, it is necessary to transmit data of about 4 times as many pixels in a period of one frame, and the transfer rate increases to about 4 times that of image data of the HD format. Transmission of image data with such a high transfer rate to another device is challenging at present.

As one technique of transmitting image data of 4K resolution, 4-division transmission with 4 prepared transmission paths is known. In other words, when an imaging device is to be connected to another device, for example, the connection is performed using 4 connection cables, and an image processing unit in the imaging device divides 4K image data into 4, and then generates 4 pieces of divided image data of the HD format. Then, the imaging device separately outputs the 4 pieces of divided image data of the HD format to the 4 transmission cables. The device that has received the image data transmitted from the imaging device combines the image data separately transmitted from the 4 transmission cables into one piece of data to restore the original 4K image data.

By dividing data into 4 pieces as described above, the transfer rate of each transmission cable becomes substantially the same as the transfer rate when the image data of the HD format is transmitted, and thus 4K image data can be transmitted in application of an established transmission format.

Japanese Unexamined Patent Application Publication No. 2011-259332 discloses an example of the technique of dividing 4K image data into 4 pieces of data and transmitting them.

SUMMARY

Meanwhile, digital image data is generally transmitted as parallel data in an information processing device such as an imaging device. When data of one pixel consists of 24 bits, for example, the 24-bit data is transmitted on 24 lines as parallel data in an imaging device.

Here, it is assumed that an imaging device simultaneously processes four pieces of divided image data of the HD format which are obtained by dividing 4K image data into four pieces. In addition, when one pixel of each piece of the divided image data is 24-bit data, the image data is data having a total of 96 bits that is the sum of 24×4.

In order to transmit 96-bit data as parallel data, it is necessary to connect processing units to each other with 96 lines. However, connecting the processing units to each other with 96 lines in an imaging device is unrealistic in light of securing an area on a substrate in which a wiring pattern is disposed and connection terminals of the processing units, and the like.

Thus, it is necessary for a device such as an imaging device that treats image data to make transmission of the image data within the device efficient along with an increasing number of pixels of image data.

It is desirable to enhance transmission efficiency when image data is transmitted within a device.

According to an embodiment of the present disclosure, there is provided an information processing device which includes N first clock conversion units (N is an integer), a serial conversion unit, a parallel conversion unit, N second clock conversion units, and a synchronized data generation unit. The first clock conversion units convert image data as parallel data into image data having a specific clock cycle.

The serial conversion unit converts N pieces of the image data converted by the first clock conversion units into one-system serial data and outputs the converted data.

The parallel conversion unit is input with the image data converted by the serial conversion unit and converts the data into N pieces of parallel data having a predetermined number of bits.

The synchronized data generation unit generates synchronized data of the image data.

The second clock conversion units reconvert the image data converted by the parallel conversion unit to an original clock cycle from the specific clock cycle and set the clock cycle of the converted image data to be in a phase in synchronization with the synchronized data generated by the synchronized data generation unit.

According to another embodiment of the present disclosure, there is provided an imaging device which includes an imaging unit, N first clock conversion units (N is an integer), a serial conversion unit, a parallel conversion unit, N second clock conversion units, and a synchronized data generation unit.

The imaging unit performs imaging and outputs image data.

The first clock conversion units are supplied with image data imaged and obtained by the imaging unit as parallel data and convert the image data as parallel data into image data having a specific clock cycle.

The serial conversion unit converts N pieces of the image data converted by the first clock conversion units into one-system serial data and outputs the converted data;

The parallel conversion unit is input with the image data converted by the serial conversion unit and converts the image data into N pieces of parallel data having a predetermined number of bits.

The synchronized data generation unit generates synchronized data of the image data.

The second clock conversion units reconvert the image data converted by the parallel conversion unit to an original clock cycle from the specific clock cycle and set the clock cycle of the converted image data to be in a phase in synchronization with the synchronized data generated by the synchronized data generation unit.

The output unit outputs the image data converted by the second clock conversion units.

According to another embodiment of the present disclosure, there is provided an information processing method in which N pieces (N is an integer) of image data as parallel data are converted into image data having a specific clock cycle. Then, the image data having the specific clock cycle is converted into one-system serial data. Then, the image data converted into the serial data is converted into N pieces of parallel data having a predetermined number of bits. Further, the parallel data having the predetermined number of bits is reconverted to an original clock cycle from the specific clock cycle. During the conversion, the clock cycle of the converted image data is set to be in a phase in synchronization with synchronized data.

According to an embodiment of the present disclosure, since image data as parallel data is converted into serial data and then transmitted, the image data can be transmitted with high efficiency in a device using a transmission path of the serial data.

According to an embodiment of the present disclosure, image data can be transmitted as serial data within a device, and can be transmitted in a small wiring pattern on a substrate even when, for example, the image data has a large number of pixels, and accordingly, image data can be transmitted with high efficiency.

DETAILED DESCRIPTION OF THE EMBODIMENT(S)

Figure 1:
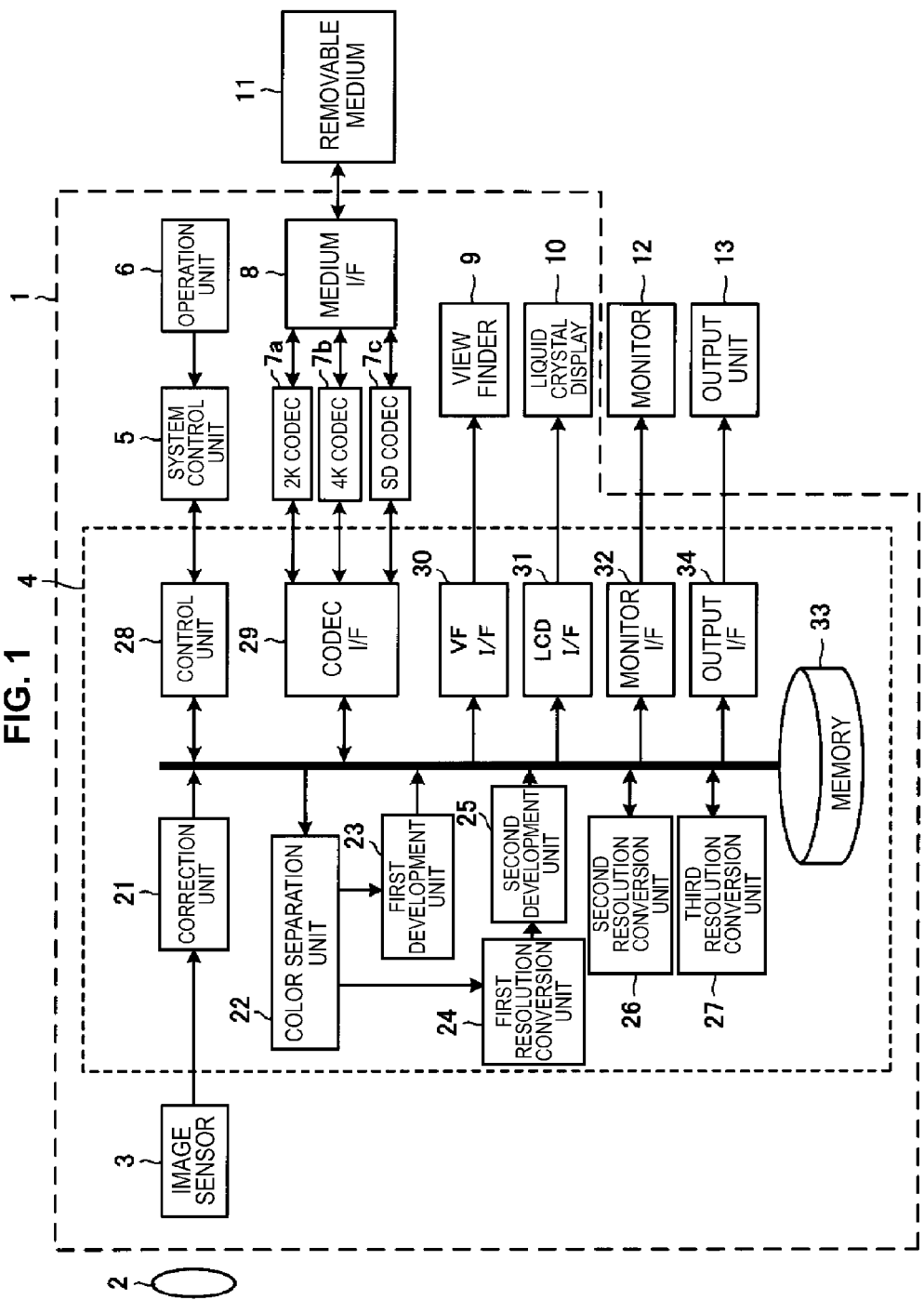
FIG. 1 is a block diagram illustrating an overall configuration of an imaging device according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the present disclosure will be described in the following order.
1. First embodiment
1-1. Overall configuration example of imaging device (FIG. 1)
1-2. Transmission example of image data (FIG. 2)
1-3. Selection example of image data (FIG. 3)
1-4. Configuration example and operation example of an output interface unit (FIGS. 4 and 5)
1-5. Configuration example and operation example of an output unit (FIGS. 6 and 7)
1-6. Example of processing timings (FIGS. 8 and 9)
2. Second embodiment
2-1. Transmission example of image data
2-2. Example of processing timings (FIGS. 10 and 11)
3. Modified example 1. First Embodiment

[1-1. Overall Configuration Example of an Imaging Device]

FIG. 1 is a diagram illustrating a configuration example of an information processing device according to a first embodiment of the present disclosure. In the first embodiment, an example to which an imaging device is applied as the information processing device will be shown. The imaging device 1 illustrated in FIG. 1 realizes a signal processing method performed in cooperation with internal blocks to be described later through execution of a program by a computer.

The imaging device 1 has an image sensor 3 which outputs image data using image light of a subject of which an image is formed on an imaging plane by an optical system 2 constituted by lenses, and the like, and an image data processing unit 4 which processes the image data. The image sensor 3 includes a CCD (Charge Coupled Device) image sensor, a CMOS (Complementary Metal Oxide Semiconductor) image sensor, or the like. As the image sensor 3, an image sensor which has a sufficient number of pixels in imaging 4K image data is used.

In addition, the imaging device 1 has a system control unit 5 which controls imaging of the image sensor 3, processing of the image data processing unit 4, and the like, and an operation unit 6 which receives operation inputs of a user and outputs operation signals to the system control unit 5. In addition, the imaging device 1 has a 2K codec unit 7a which encodes 2K image data, a 4K codec unit 7b which encodes 4K image data, and an SD codec unit 7c which encodes SD image data. Each of the codec units 7a, 7b, and 7c encodes image data output from the image sensor 3 into image data of a corresponding format.

The 2K image data that is encoded by the 2K codec unit 7a is image data of an HD format having the number of horizontal pixels×the number of vertical lines of about 2000×about 1000 (or image data having equivalent resolution thereto). The 4K image data that is encoded by the 4K codec unit 7b is image data having the number of horizontal pixels×the number of vertical lines of about 4000×about 2000. The SD (Standard Definition) image data that is encoded by the SD codec unit 7c is image data of an SD format having the number of horizontal pixels×the number of vertical lines of 720×480 (or image data having equivalent resolution thereto).

In addition, there are cases in which image data is set to be primary color data (RGB data) and to be luminance data and color difference data (YC data) when each of the codec units 7a, 7b, and 7c encodes image data of each format. In addition, in each format, there are various frame frequencies of 24 Hz, 50 Hz, 60 Hz, and the like. Further, in each of the frame frequencies, there are a progressive scan system and an interlace scan system. When a format of image data is described hereinbelow, addition of P such as 50P or 60P indicates the progressive scan system, and addition of I such as 50I or 60I indicates the interlace scan system. The number in 50P or 50I indicates a frame frequency.

Note that, when 4K image data is generated, the 4K codec unit 7b can generate 4 pieces of 2K image data by dividing the 4K image data into 4 pieces. When the 4 pieces of divided image data are generated, there are a plurality of dividing methods for 4-way division. For example, there is a case in which pixels of one frame are divided into 4 regions of upper left, upper right, lower left and lower right regions, and a case in which pixels of one frame are sequentially allocated into 4 pieces of image data.

In addition, the imaging device 1 has a medium interface 8 into which a removable medium 11 is loaded. The medium interface 8 writes image data received from each of the codec units 7a, 7b, and 7c on the removable medium 11. In addition, the medium interface 8 supplies the image data read from the removable medium 11 to each of the codec units 7a, 7b, and 7c having a scale corresponding to the image data.

In addition, the imaging device 1 has a view finder 9 and a liquid crystal display 10. Resolution of an image that can be displayed on the view finder 9 and the liquid crystal display 10 is lower than that of a 4K image or a 2K image, and thus it is necessary to convert the resolution of the 4K image or 2K image according to the resolution of the view finder 9 and the liquid crystal display 10.

In addition, in the imaging device 1, a monitor 12 which outputs 4K image data or 2K image data externally and can display 4K images or 2K images thereon is installed. Since the monitor 12 can display 4K images of which resolution has not been converted, actually photographed images can be checked.

The image data processing unit 4 has a correction unit 21 which performs correction of image data input from the image sensor 3 and a color separation unit 22 which performs a color separation process of separating primary colors of R, G, and B from the corrected image data. In addition, the image data processing unit 4 has a first development unit 23 and a second development unit 25 which perform a development process on the image data output from the color separation unit 22. The development process herein refers to a process in which colors of the image data output from the color separation unit 22 are adjusted so that the image data is converted into appropriate image data of each format. The first development unit 23 performs the development process on the 4K image data.

In addition, the image data processing unit 4 has a first resolution conversion unit 24 which performs conversion of resolution of the image data output from the color separation unit 22. The first resolution conversion unit 24 performs a process of converting the 4K image data into 2K image data. The 2K image data of which resolution is converted by the first resolution conversion unit 24 is supplied to the second development unit 25, and the second development unit 25 performs a development process on the 2K image data.

In addition, the image data processing unit 4 has a second resolution conversion unit 26 which converts resolution of the 2K image data into resolution of image data in a size that can be displayed on the view finder 9. Further, the image data processing unit 4 has a third resolution conversion unit 27 which converts the resolution of the 2K image data into resolution of image data in an image size that can be displayed on the liquid crystal display 10.

In addition, the image data processing unit 4 has a control unit 28 which controls operations of each unit in the image data processing unit 4, and a codec interface 29 which serves as an interface of the 2K codec unit 7a and the 4K codec unit 7b. In addition, the image data processing unit 4 has a view finder interface 30 which serves as an interface of the view finder 9 and a liquid crystal display interface 31 which serves as an interface of the liquid crystal display 10. In addition, the image data processing unit 4 has a monitor interface 32 which serves as an interface of the monitor 12.

In addition, the image data processing unit 4 has a memory 33. The memory 33 can store image data such as the 4K image data.

In addition, the image data processing unit 4 has an output interface 34, and image data output from the output interface 34 is supplied to the output unit 13 of the imaging device 1. The output interface 34 outputs image data which has been encoded by each of the codec units 7a, 7b, and 7c, and the like to the output unit 13.

The output unit 13 has output terminals of image data, and transmits image data from the imaging device 1 to an external information processing device (not illustrated) connected via the output terminals. The output unit 13 can output image data of various formats such as 4K image data or 2K image data. The output unit 13 has at least 4 output terminals. In addition, when 4K image data is output, for example, 4 pieces of 2K image data obtained by dividing the 4K image data into four pieces are output from the four output terminals. In addition, the four output terminals can also output image data of different formats. The format of image data output by the output unit 13 is decided according to an instruction from the system control unit 5.

The image data processing unit 4 is configured by an integrated circuit called LSI (Large Scale Integration), and the LSI is also built in the output interface 34. When image data is transmitted to the output unit 13, the output interface 34 in the image data processing unit 4 transmits the data by turning the data into parallel data.

[1-2. Transmission Example of Image Data]

Figure 2:
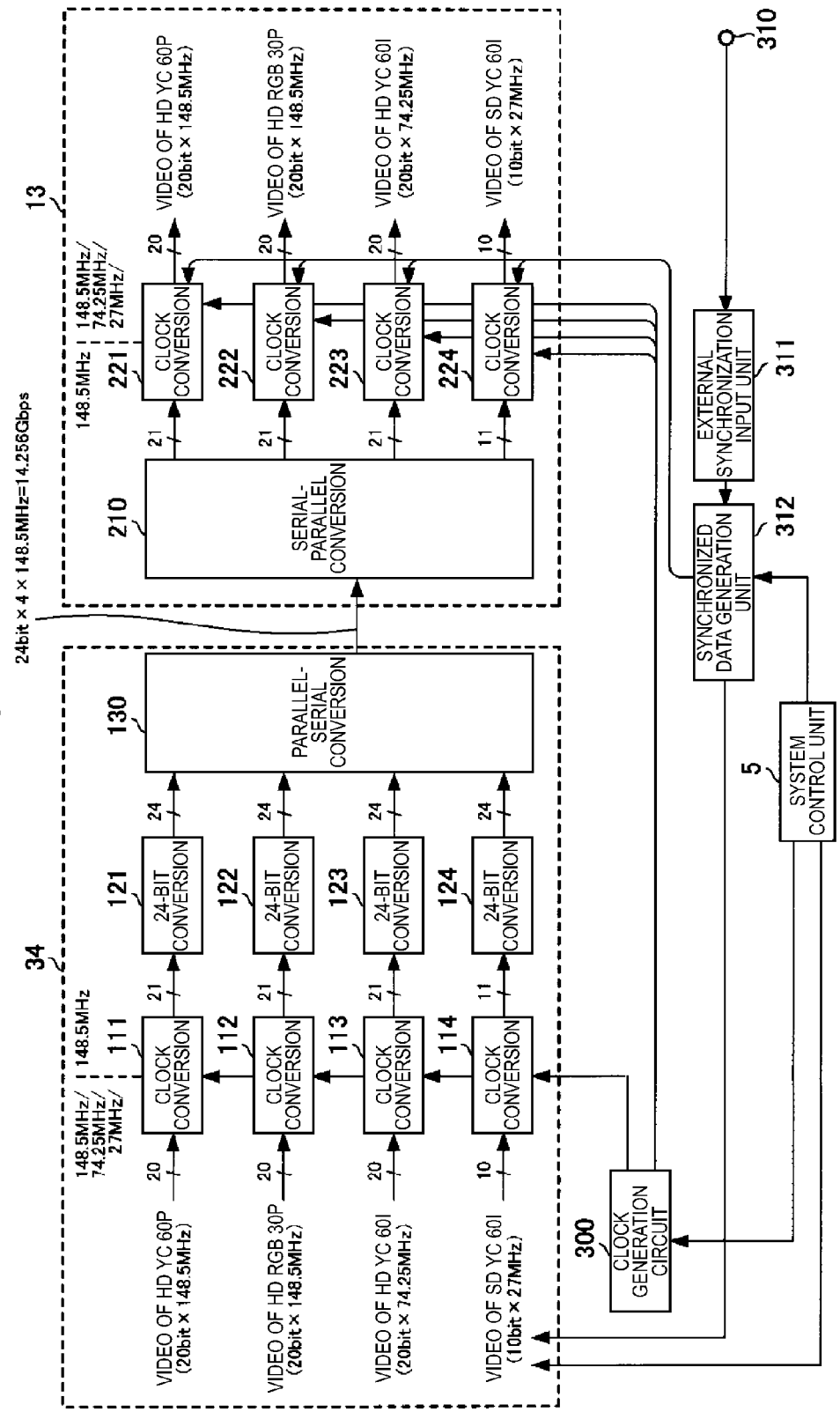
FIG. 2 is a block diagram illustrating an example of transmission of image data according to the first embodiment of the present disclosure.

FIG. 2 is a configuration diagram illustrating a transmission example of image data between the output interface 34 in the image data processing unit 4 and the output unit 13. As previously described, the output unit 13 has four output terminals, and the output interface 34 transmits image data of four systems for outputting the data from the four output terminals to the output unit 13.

As illustrated in FIG. 2, the output interface 34 has four clock conversion units 111 to 114 which convert clock frequencies of the image data of the four systems. The image data of the four systems supplied to the output interface 34 is parallel data with clock frequencies in each format of the image data.

In the example of FIG. 2, image data of 60P (the progressive scan system with a frame frequency of 60 Hz) in a YC data format of the HD format is supplied to the first clock conversion unit 111. One pixel of the image data supplied to the first clock conversion unit 111 consists of 20 bits, and the pixel clock frequency thereof is 148.5 MHz.

In addition, image data of 30P (progressive scan system with a frame frequency of 30 Hz) in an RGB data format of the HD format is supplied to the second clock conversion unit 112. One pixel of the image data supplied to the second clock conversion unit 112 consists of 20 bits, and the pixel clock frequency thereof is 148.5 MHz.

In addition, image data of 60I (interlace scan system with a frame frequency of 60 Hz) in the YC data format of the HD format is supplied to the third clock conversion unit 113. One pixel of the image data supplied to the third clock conversion unit 113 consists of 20 bits, and the pixel clock frequency thereof is 74.25 MHz.

In addition, image data of 60I (interlace scan system with a frame frequency of 60 Hz) in the YC data format of the SD format is supplied to the fourth clock conversion unit 114. One pixel of the image data supplied to the fourth clock conversion unit 114 consists of 10 bits, and the pixel clock frequency thereof is 27 MHz.

Note that the formats of the four pieces of image data shown in FIG. 2 are examples, and a combination of pieces of image data of various formats can be applied thereto as will be described later. In addition, there are cases in which the number of pieces of the image data supplied to the clock conversion units 111 to 114 is less than four.

The four clock conversion units 111 to 114 convert individual clock frequencies into one specific clock frequency. In this example, each of the clock conversion units 111 to 114 converts the pixel clock frequencies of the input image data into 148.5 MHz. 148.5 MHz is one clock frequency of image data of the HD format. When the image data input to the clock conversion units 111 to 114 is in the HD format and has the clock frequency of 148.5 MHz, each of the clock conversion units 111 to 114 outputs the data as it is without converting the clock frequency.

With regard to the image data output by the four clock conversion units 111 to 114, a valid period in which the image data is arranged and an invalid period in which the image data is not arranged are generated along the conversion of the clock frequencies. Each of the clock conversion units 111 to 114 generates an enable signal which is data indicating the valid period and invalid period, and the enable signal is added to the output image data.

Then, the image data with the clock frequency of 148.5 MHz output by the clock conversion units 111 to 114 is supplied to bit number conversion units 121 to 124, respectively. The image data as parallel data of 21 bits including the aforementioned enable signal is supplied to each of the bit number conversion units 121 to 124, and converted into parallel data of 24 bits obtained by adding 3 invalid bits to the 21 bits.

The parallel image data of 24 bits with the clock frequency of 148.5 MHz output by each of the bit number conversion units 121 to 124 is supplied to a parallel-serial conversion unit 130. The parallel-serial conversion unit 130 converts the parallel image data of 96 bits which is the sum of respective 24 bits of each piece of the image data into one-system serial data. The serial image data output by the parallel-serial conversion unit 130 has a transfer rate of 4×24 bits×148.5 MHz=14.256 Gbps.

The serial image data output by the parallel-serial conversion unit 130 is transmitted to a serial-parallel conversion unit 210 in the output unit 13. The serial-parallel conversion unit 210 converts the supplied serial image data into parallel image data, and divides the data into 4 pieces of image data. The pieces of the parallel image data converted by the serial-parallel conversion unit 210 are data pieces each of which has a pixel clock frequency of 148.5 MHz and has 21 bits in one pixel. One bit among the 21 bits is the enable signal. In other words, in the serial-parallel conversion unit 210, the four pieces of image data input to the bit number conversion units 121 to 124 in the output interface 34 are restored. The data of 3 bits added in the bit number conversion units 121 to 124 is not extracted in the serial-parallel conversion unit 210.

In addition, the four pieces of image data output by the serial-parallel conversion unit 210 are supplied to each of clock conversion units 221 to 224.

Each of the clock conversion units 221 to 224 performs reconversion to the clock frequencies of the image data input to the four clock conversion units 111 to 114 on the output interface 34 side. At this moment, each of the clock conversion units 221 to 224 performs a process of extracting data of a valid period using the enable signal.

A maximum of 4 pieces of image data output by each of the clock conversion units 221 to 224 in the output unit 13 as described above is supplied to each output processing unit (not illustrated) of the output terminals, and converted into image data of a transmission format. In the case of output terminals for transmitting serial data, the image data obtained in the output processing units is converted into serial data. Then, the image data converted in each output processing unit is individually output from the four output terminals.

Note that, as illustrated in FIG. 2, the imaging device 1 has a synchronized data input terminal 310, and the image data output from each of the output terminals of the output unit 13 is set to be image data in a phase synchronized with synchronized data serving as a reference obtained in the synchronized data input terminal 310. In order to perform the synchronization process, an external synchronization input unit 311 captures the timing of the synchronized data obtained in the synchronized data input terminal 310. Then, a synchronized data generation unit 312 creates synchronized data at a timing which coincides with the synchronization timing captured by the external synchronization input unit 311, and supplies the data to each of the clock conversion units 221 to 224. In each of the clock conversion units 221 to 224, clock cycles are adjusted so that clock timings of the image data of which clock frequencies have been converted are in the phase that coincides with the synchronization timings instructed in the supplied synchronization data. The synchronized data generated by the synchronized data generation unit 312 is also supplied to the image data processing unit 4.

Further, clocks of frequencies converted by a clock generation circuit 300 are supplied to the clock conversion units 111 to 114 of the image data processing unit 4 and the clock conversion units 221 to 224 in the output unit 13.

The synchronized data generation unit 312 and the clock generation circuit 300 may each be separately provided on the image data processing unit 4 side and on the output unit 13 side.

As illustrated in FIG. 2, a transmission process of image data is performed between the output interface 34 and the output unit 13. For this reason, when image data is output from the output interface 34 in the image data processing unit 4 configured by LSI, it is not necessary to output the image data as parallel data. Thus, even when the image data of 4 systems is simultaneously read as in the example of the present disclosure, the number of wirings disposed between the output interface 34 and the output unit 13 can be drastically reduced, and the image data can be transmitted within the device with high efficiency. In the example of FIG. 2, converting the 4 pieces of image data into one-system serial data and transmitting the data has been exemplified, however, the process of the present disclosure can be applied to an example in which N arbitrary pieces (N is an integer) of image data are converted into one-system serial data and transmitted.

[1-3. Selection Example of Image Data]

Figure 3:
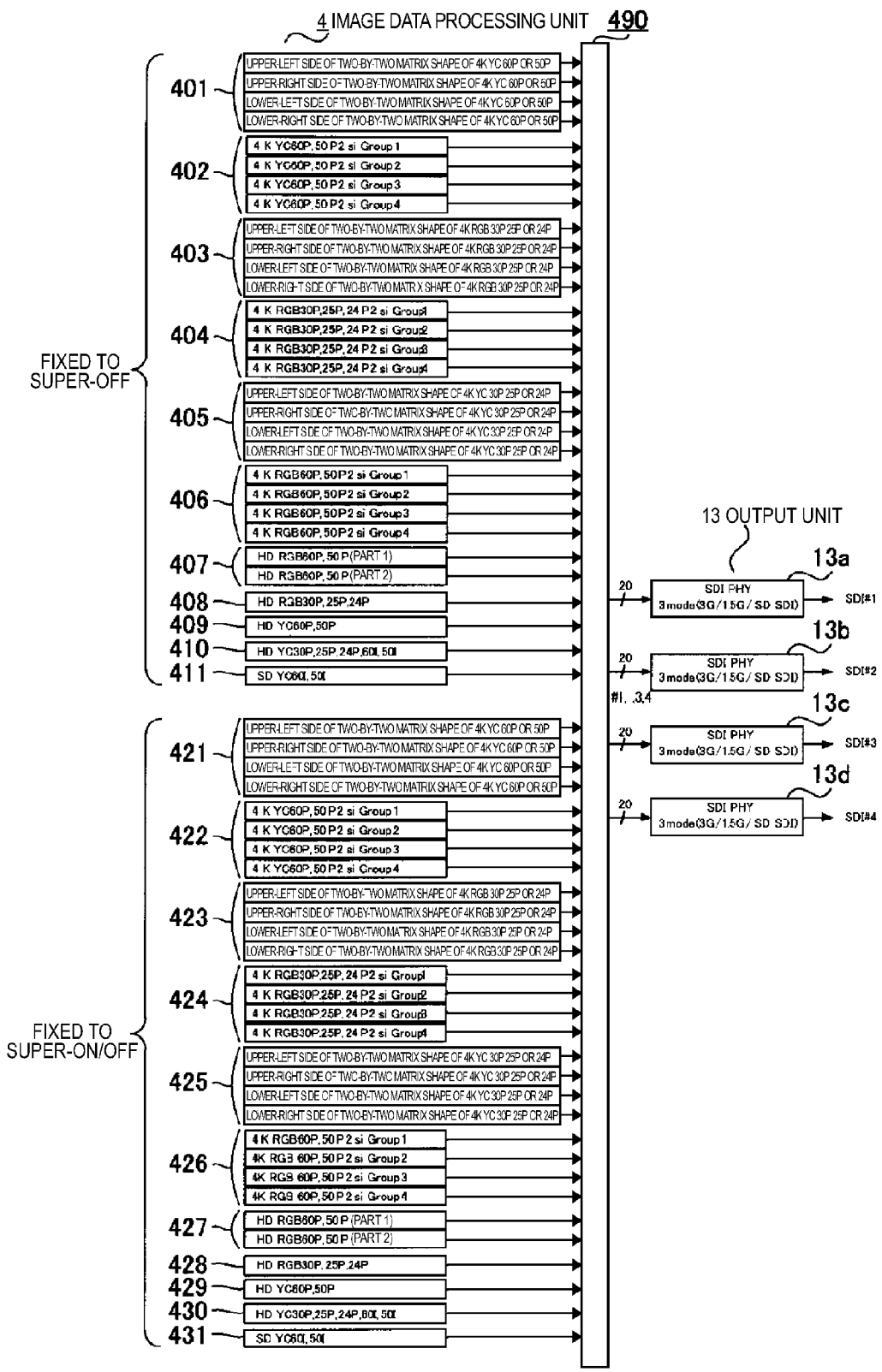
FIG. 3 is a diagram illustrating an example of selection of image data according to the first embodiment of the present disclosure.

FIG. 3 is a diagram illustrating a selection example of a combination of 4 pieces of image data supplied from the image data processing unit 4 to the output unit 13. In FIG. 3, after an image data selection unit 490 selects any of the pieces of the image data, the image data selection unit performs a process of performing parallel-serial conversion and serial-parallel conversion illustrated in FIG. 2, and then transferring the 4 pieces of image data to the output unit 13.

Then, the 4 pieces of image data transmitted to the output unit 13 via the image data selection unit 490 are supplied to each of physical layer processing units 13a, 13b, 13c, and 13d, and then converted into image data output from the 4 output terminals in each of the physical layer processing units 13a, 13b, 13c, and 13d. Each of the physical layer processing units 13a, 13b, 13c, and 13d is a serial digital interface (SDI), and can select three kinds of output formats according to a transfer rate, and the like.

As illustrated in FIG. 3, the image data processing unit 4 can generate image data of various formats. In the example shown in FIG. 3, 11 image generation units 401 to 411 output image data fixed to be super-off, and 11 image generation units 421 to 431 output image data selected to be any of super-on or super-off. The image generation units 401 to 411 and 421 to 431 are image generation units that can be virtually generated in the image data processing unit 4, and image processes in the same number are not actually prepared. Note that image data of super-on is image data obtained by superimposing numbers such as time codes or text for various guidance on an image obtained from imaging. On the other hand, image data of super-off is image data that is obtained from imaging and output without change.

A specific example of image formats output by each of the image generation units 401 to 411 and 421 to 431 will be described.

The image generation units 401 and 421 generate four pieces of image data having pixel data in the YC data format which are obtained by dividing 4K image data of 50P or 60P into four. Dividing data into four mentioned herein means dividing each frame into an upper-left region, an upper-right region, a lower-left region, and a lower-right region.

The image generation units 402 and 422 generate four pieces of image data having pixel data in the YC data format which are obtained by dividing 4K image data of 50P or 60P into four. Dividing data into four mentioned herein means sorting image data in a predetermined order and dividing the data into four groups.

The image generation units 403 and 423 generate four pieces of image data having pixel data in the RGB data format which are obtained by dividing 4K image data of any of 30P, 25P and 24P into four. Dividing data into four mentioned herein means dividing each frame into an upper-left region, an upper-right region, a lower-left region, and a lower-right region.

The image generation units 404 and 424 generate four pieces of image data having pixel data in the RGB data format which are obtained by dividing 4K image data of any of 30P, 25P and 24P into four. Dividing data into four mentioned herein means sorting image data in a predetermined order and dividing the data into four groups.

The image generation units 405 and 425 generate four pieces of image data having pixel data in the YC data format which are obtained by dividing 4K image data of any of 30P, 25P and 24P into four. Dividing data into four mentioned herein means dividing each frame into an upper-left region, an upper-right region, a lower-left region, and a lower-right region.

The image generation units 406 and 426 generate four pieces of image data having pixel data in the RGB data format which are obtained by dividing 4K image data of 50P or 60P into four. Dividing data into four mentioned herein means sorting image data in a predetermined order and dividing the data into four groups.

The image generation units 407 and 427 generate two pieces of image data having pixel data in the RGB data format which are obtained by dividing image data of the HD format of 50P or 60P into two.

The image generation units 408 and 428 generate image data of the HD format of any of 30P, 25P, and 24P having pixel data in the RGB data format.

The image generation units 409 and 429 generate image data of the HD format of 50P or 60P having pixel data in the YC data format.

The image generation units 410 and 430 generate image data of the HD format of any of 30P, 25P, 24P, 50I, and 60I having pixel data in the YC data format.

The image generation units 411 and 431 generate image data of the SD format of 50I or 60I having pixel data in the YC data format.

The image data selection unit 490 selects the maximum of 4 pieces of image data among the image data generated by each of the image generation units 401 to 411 and 421 to 431, and transfers the data to the physical layer processing units 13a, 13b, 13c, and 13d of the output unit 13. The data is transmitted as serial data between the image data processing unit 4 and the output unit 13 as described in FIG. 2.

When the image data selection unit 490 selects the four pieces of image data, the four pieces of image data may be set to be obtained in any combination. However, with regard to the pieces of image data obtained by dividing the 4K image data into four and the pieces of image data obtained by dividing the HD image data into two, it is preferable to select four or two pieces of divided image data at the same time.

One example of the combination of the four pieces of image data is the image data output by the four clock conversion units 221 to 224 illustrated in FIG. 2 described above.

[1-4. Configuration Example and Operation Example of the Output Interface Unit]

Figure 4:
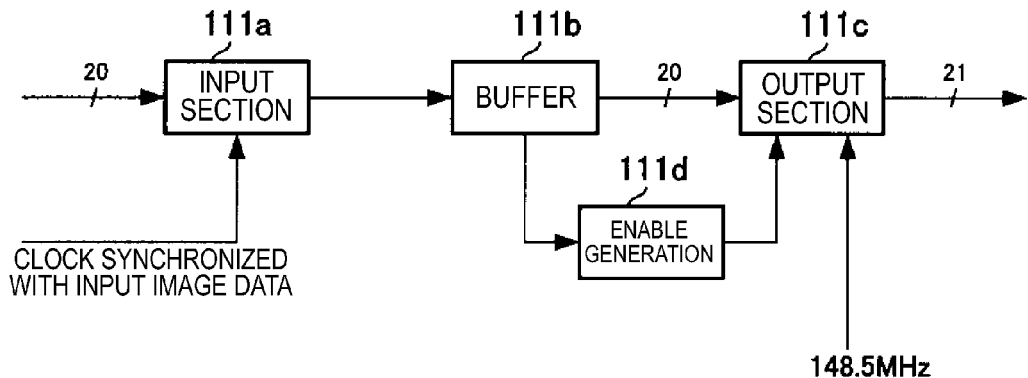
FIG. 4 is a block diagram illustrating an output interface unit according to the first embodiment of the present disclosure.

FIG. 4 is a diagram illustrating a configuration example of the clock conversion unit 111 in the output interface 34.

FIG. 4 illustrates the configuration of one clock conversion unit 111, however, other clock conversion units 112, 113, and 114 illustrated in FIG. 2 have the same configuration.

As illustrated in FIG. 4, the clock conversion unit 111 has an input section 111a to which image data is supplied, a buffer 111b which temporarily stores the image data supplied to the input section 111a, and an output section 111c which outputs the image data read from the buffer 111b.

To the input section 111a, image data having a predetermined number of bits (for example, 20 bits) is supplied and a clock synchronized with the input image data is supplied. Then, in synchronization with the supplied clock, the input section 111a writes the image data in the buffer 111b.

In this example, the input section 111a writes the image data in the buffer 111b as parallel data of which one pixel consists of 20 bits.

To the output section 111c, a clock of 148.5 MHz is supplied. The output section 111c reads the image data accumulated in the buffer 111b using the clock of 148.5 MHz. Here, the clock conversion unit 111 has an enable generation section 111d which generates enable signals. The enable generation section 111d generates enable signals based on the state of the buffer 111b reading the image data. To be specific, the enable generation section 111d outputs an enable signal of "1" for the period in which the output section 111c reads the image data from the buffer 111b. In addition, the enable generation section 111d outputs an enable signal of "0" for the period in which the output section 111c does not read the image data from the buffer 111b.

The image data read from the buffer 111b is parallel data of which one pixel consists of 20 bits, the enable signal of 1 bit is added to the parallel data of 20 bits, and accordingly, the image data of 21 bits is output from the output section 111c.

Figure 5:
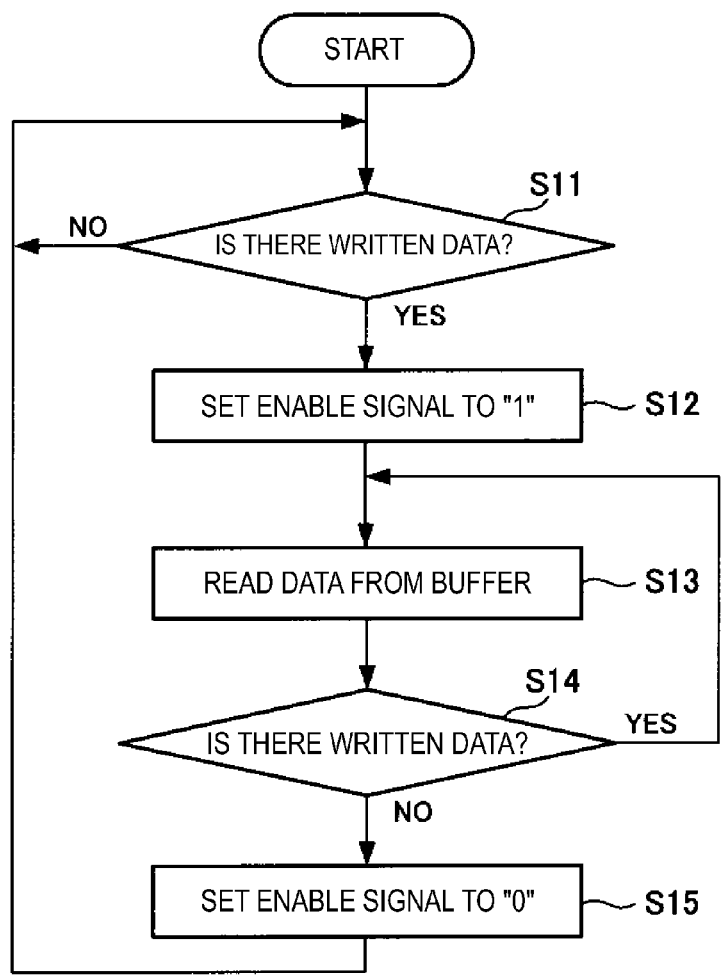
FIG. 5 is a flowchart showing a process of the output interface unit according to the first embodiment of the present disclosure.

FIG. 5 is a flowchart showing a processing example in which the enable generation section 111d generates an enable signal in synchronization with reading of the image data from the buffer 111b in the clock conversion unit 111.

First, the enable generation section 111d determines whether or not there is data written in the buffer 111b (Step S11). Here, when there is no written data, the enable generation section stands by until new pixel data is written.

When it is determined that there is data written in the buffer 111b in Step S11, the enable generation section 111d sets an enable signal to be "1" (Step S12). Then, the output section 111c reads the image data written in the buffer 111b in synchronization with a clock (Step S13). After reading of the image data, the output section 111c further determines whether or not there is data written in the buffer 111b (Step S14), and when there is written data, the process returns to Step S13, and reading of the written data is performed.

Then, when there is no data written in the buffer 111b in Step S14, the process returns to the determination of Step S11, and the enable generation section stands by until new pixel data is written.

[1-5. Configuration Example and Operation Example of the Output Unit]

Figure 6:
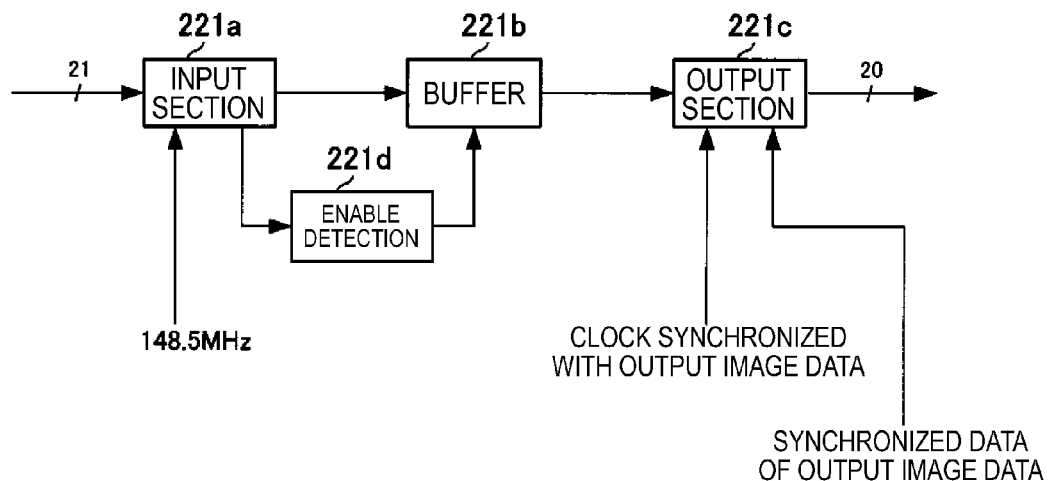
FIG. 6 is a block diagram illustrating an output unit according to the first embodiment of the present disclosure.

FIG. 6 is a diagram illustrating a configuration example of the clock conversion unit 221 in the output unit 13.

FIG. 6 illustrates the configuration of only the clock conversion unit 221, however, other clock conversion units 222, 223, and 224 illustrated in FIG. 2 have the same configuration.

As illustrated in FIG. 6, the clock conversion unit 221 has an input section 221a to which image data is supplied, a buffer 221b which temporarily stores the image data supplied to the input section 221a, and an output section 221c which outputs the image data read from the buffer 221b.

To the input section 221a, data of 21 bits converted by the serial-parallel conversion unit 210 is supplied. 1 bit out of the 21 bits is an enable signal, and the remaining 20 bits constitute the image data. Then, in synchronization with a supplied clock of 148.5 MHz and the enable signal, the input section 221a writes the image data of 20 bits in the buffer 221b.

The enable signal of 1 bit obtained by the input section 221a is supplied to an enable detection section 221d. The enable detection section 221d writes the input image data in the buffer 221b at the timing at which the enable signal is "1." In addition, at the timing at which the enable signal is "0," the enable detection section 221d stops writing of the input image data in the buffer 221b.

To the output section 221c, a clock of the output image data and synchronized data with the output image data is supplied. The output section 221c reads the image data accumulated in the buffer 221b using the supplied clock. The image data read from the buffer 221b is output in the state in which the synchronized data is added thereto.

Figure 7:
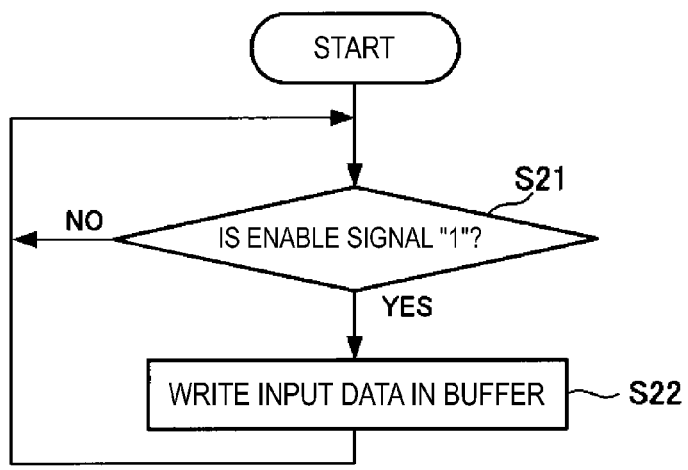
FIG. 7 is a flowchart showing a process of the output unit according to the first embodiment of the present disclosure.

FIG. 7 is a flowchart showing a processing example in which the input section 221a in the clock conversion unit 221 writes the image data in the buffer 221b.

First, the enable detection section 221d determines whether or not the supplied enable signal is "1" (Step S21). When the enable signal is "1" in the determination, the input section 221a writes the input image data in the buffer 221b (Step S22). After the writing, the enable detection section 221d returns to the determination of Step S21. In addition, when the enable signal is not "1" in Step S21, the enable detection section 221d also returns to the determination of Step S21, and stands by until the enable signal becomes "1."

[1-6. Example of a Processing Timing]

Figure 8:
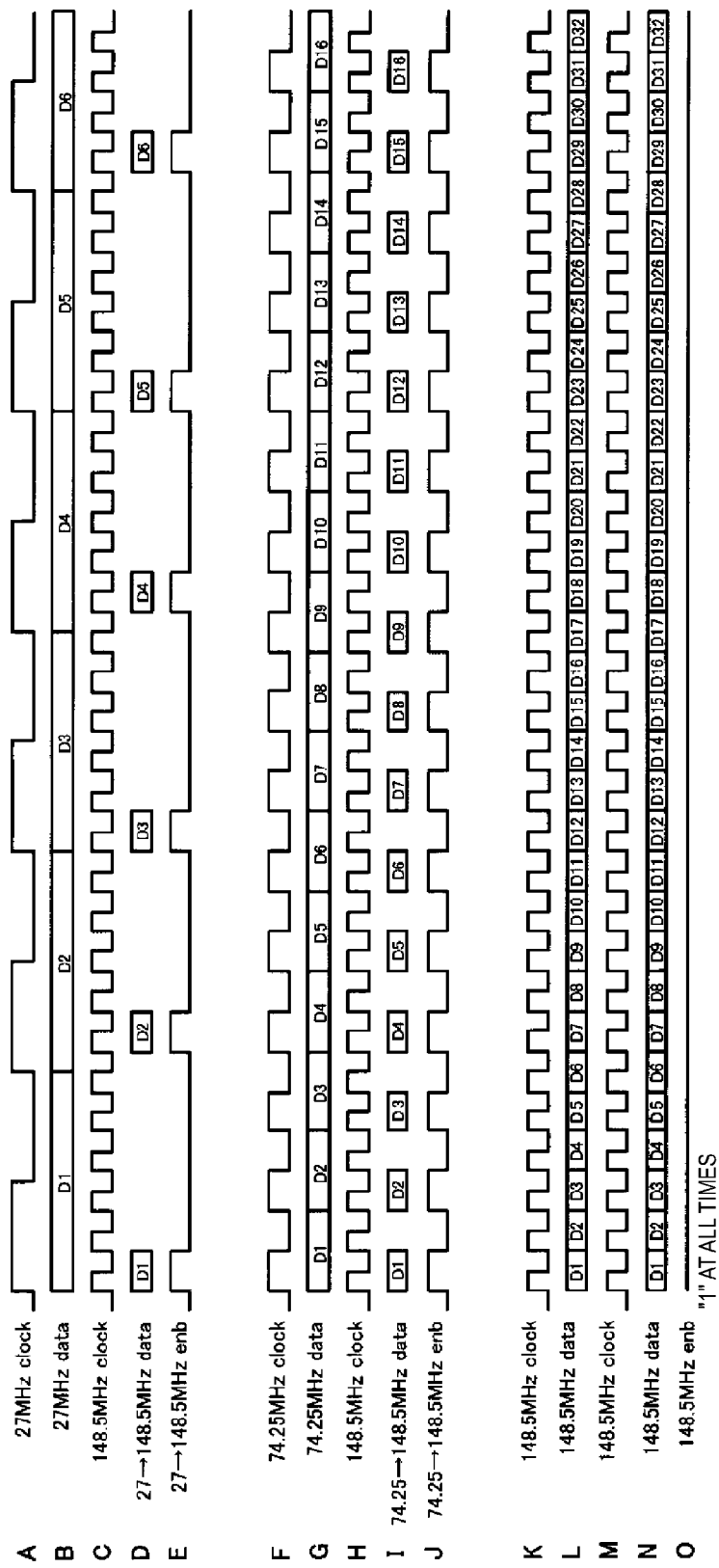
FIG. 8 is a timing chart showing transmission timings of image data according to the first embodiment of the present disclosure.
Figure 9:
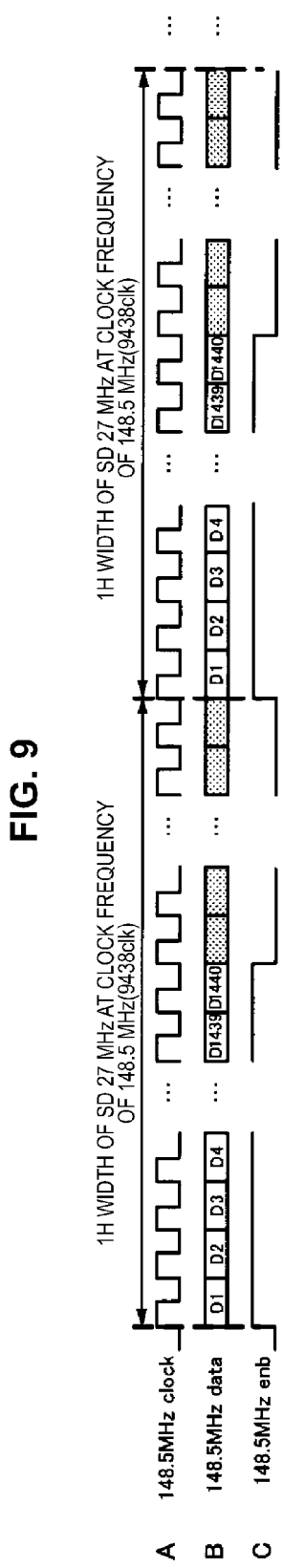
FIG. 9 is a timing chart showing another example of transmission timings (an example of transmission in units of lines) of the image data of the first embodiment of the present disclosure.

FIGS. 8 and 9 show examples of processing timings of the clock conversion units 111 to 114 in the present embodiment. A to E of FIG. 8 show a processing example when image data with a clock frequency of 27 MHz is input to the clock conversion unit 111.

Image data in units of one pixel is input to the clock conversion unit 111 as shown in B of FIG. 8 in synchronization with the clock of 27 MHz shown in A of FIG. 8. Data D1, D2, D3, . . . shown in B of FIG. 8 indicate image data of each one pixel.

The image data input as described above is read from the clock conversion unit 111 with a clock frequency of 148.5 MHz shown in C of FIG. 8. In addition the image data D1, D2, D3, . . . shown in D of FIG. 8 is image data read in synchronization with the clock frequency of 148.5 MHz. The output image data D1, D2, D3, . . . shown in D of FIG. 8 is data in which pixel data is arranged once every fifth cycle or sixth cycle of the clock frequency of 148.5 MHz.

Here, as shown in E of FIG. 8, the enable signal being "1" is generated in the period in which the pixel data is arranged. With the enable signal, a valid period and an invalid period of image data are indicated.

F to J of FIG. 8 show a processing example in which image data with a clock frequency of 74.25 MHz is input to the clock conversion unit 111.

Image data D1, D2, D3, . . . in units of one pixel is input to the clock conversion unit 111 as shown in G of FIG. 8 in synchronization with the clock frequency of 74.25 MHz shown in F of FIG. 8.

The image data input as described above is read from the clock conversion unit 111 with the clock frequency of 148.5 MHz shown in H of FIG. 8. Image data D1, D2, D3, . . . shown in I of FIG. 8 is image data read in synchronization with the clock frequency of 148.5 MHz. The output image data D1, D2, D3, . . . shown in I of FIG. 8 is data in which pixel data is arranged once every second cycle of the clock frequency of 148.5 MHz.

Here, as shown in J of FIG. 8, the enable signal being "1" is generated in the period in which the pixel data is arranged.

K and L of FIG. 8 show a processing example when image data with the clock frequency of 148.5 MHz is input to the clock conversion unit 111.

Image data D1, D2, D3, . . . in units of one pixel as shown in L of FIG. 8 is input to the clock conversion unit 111 in synchronization with the clock frequency of 148.5 MHz shown in K of FIG. 8.

In this case, the clock frequency before conversion is the same as the clock frequency after conversion. For this reason, the image data D1, D2, D3, . . . is consecutively read from the clock conversion unit 111 as shown in N of FIG. 8 in synchronization with the clock for reading shown in M of FIG. 8.

In addition, an enable signal shown in O of FIG. 8 is consecutively set to be "1" in this case.

In the example of FIG. 8, although data of each pixel input to the clock conversion unit 111 is set to be sequentially output, the pixel data may be set to be consecutively output in units of horizontal lines.

The example of FIG. 9 is an example in which pixel data is output in units of horizontal lines.

FIG. 9 is an example in which the clock conversion unit 111 converts image data of 27 MHz in the SD format into data with a frequency of 148.5 MHz and then outputs the image data. In synchronization with the clock frequency of 148.5 MHz shown in A of FIG. 9, the clock conversion unit 111 consecutively outputs pixel data D1 to D1440 constituting one horizontal line as shown in B of FIG. 9. After the clock conversion unit 111 outputs the final pixel data D1440 on one horizontal line, the clock conversion unit stops output of pixel data. Consecutive reading of the one horizontal line and stopping thereof are repeated. An enable signal shown in C of FIG. 9 is set to be "1" in the period in which the pixel data is read.

When the process illustrated in FIG. 9 is performed, a capacity for accumulating pixel data of several horizontal lines is necessary for the buffer 111b included in the clock conversion unit 111.

In addition, although not illustrated in the timing chart, the clock conversion unit 111 may repeat consecutive output of pixel data of one frame and stopping of reading of the pixel data. In this case, it is necessary for the buffer 111b included in the clock conversion unit 111 to accumulate pixel data of one or more frames.

2. Second Embodiment

[2-1. Transmission Configuration Example of Image Data]

Next, a second embodiment of the present disclosure will be described with reference to FIGS. 10 and 11.

The configuration of FIGS. 1 and 2 described in the first embodiment also applies to the second embodiment. However, in the second embodiment, a clock frequency used in transmission between the output interface 34 and the output unit 13 is different from that of FIG. 2.

In other words, in the configuration illustrated in FIG. 2, the clock conversion units 111 to 114 convert data so as to have a transfer rate of 148.5 MHz. On the other hand, in the second embodiment, the clock conversion units 111 to 114 convert input image data so as to have a transfer rate of 166 MHz. When the clock conversion units 111 to 114 convert data into image data having the transfer rate of 166 MHz, an enable signal described in the first embodiment is added to the image data so as to be data having 21 bits in each pixel. In addition, the bit number conversion units 121 to 124 convert the data into data having 24 bits in each pixel by adding 3 invalid bits to the data having 21 bits of the transfer rate of 166 MHz.

The parallel-serial conversion unit 130 converts parallel image data of 96 bits which is the sum of each 24 bits of the data into one-system serial data. The serial image data output by the parallel-serial conversion unit 130 in this case comes to have a transfer rate of 4×24 bits×166 MHz=15.936 Gbps.

The serial-parallel conversion unit 210 in the output unit 13 receives the data of the transfer rate of 15.936 Gbps, and then converts the data into parallel image data and divides the data into four pieces of image data.

In addition, each of the clock conversion units 221 to 224 performs conversion to return the clock frequency of the image data input to the four clock conversion units 111 to 114 disposed on the output interface 34 side from 166 MHz to the original frequency.

[2-2. Example of a Processing Timing]

Figure 10:
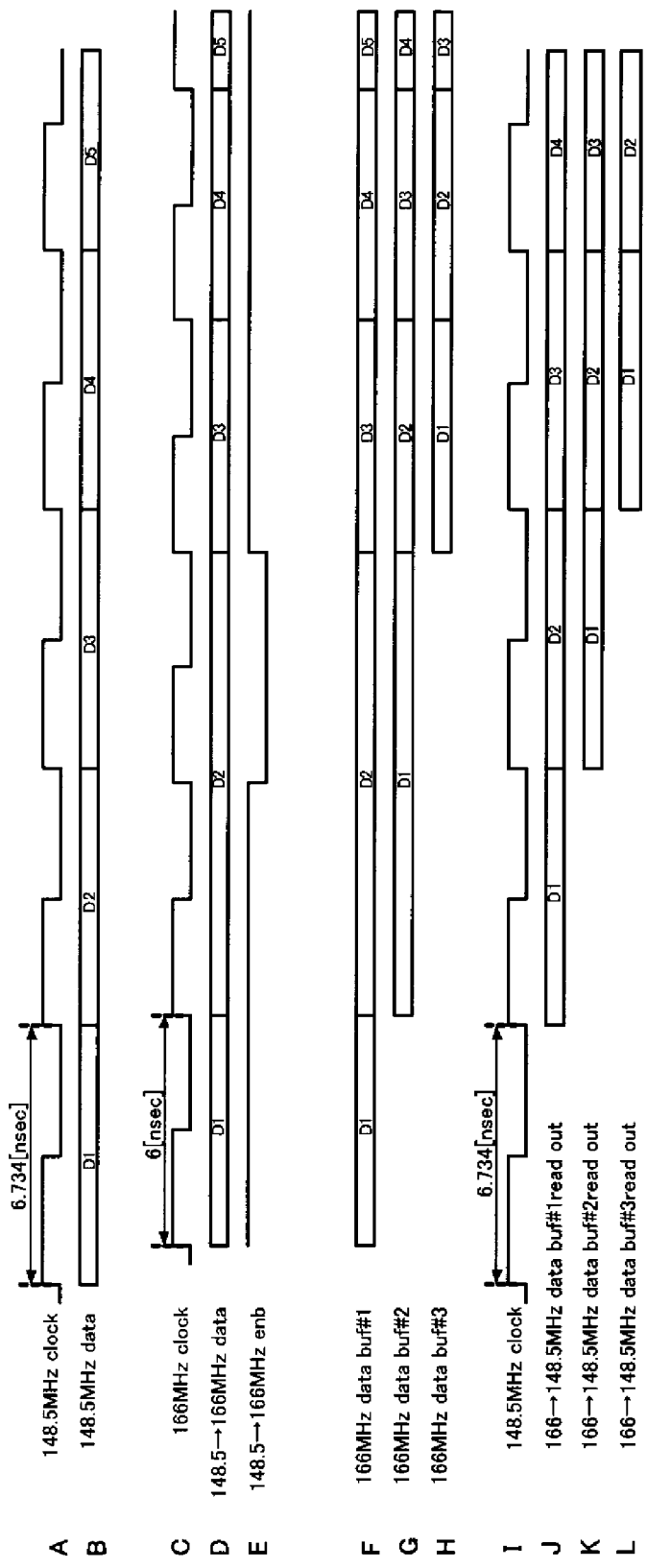
FIG. 10 is a timing chart showing transmission timings of image data according to a second embodiment of the present disclosure.
Figure 11:
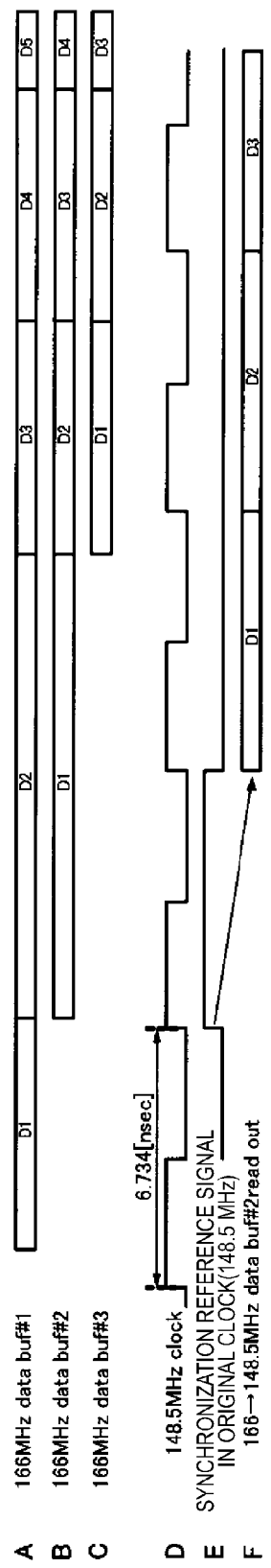
FIG. 11 is a timing chart showing another example of transmission timings of image data according to the second embodiment of the present disclosure.

FIGS. 10 and 11 are examples of processing timings of the clock conversion units 111 to 114 in the second embodiment. A to E of FIG. 10 are a processing example when image data of the clock frequency of 148.5 MHz is input to the clock conversion unit 111.

In synchronization with the clock frequency of 148.5 MHz shown in A of FIG. 10, image data in units of one pixel is input to the clock conversion unit 111 as shown in B of FIG. 10. Data D1, D2, D3, . . . shown in B of FIG. 10 indicates image data for each pixel.

The image data input as described above is read from the clock conversion unit 111 at the clock frequency of 166 MHz shown in C of FIG. 10. Image data D1, D2, D3, . . . shown in D of FIG. 10 is image data read in synchronization with the clock frequency of 166 MHz. With regard to the output image data D1, D2, D3, . . . shown in D of FIG. 10, a process of reading the pixel data D2 in a specific position for two consecutive clock periods is performed in order to adjust a period generated due to the difference between the clock frequencies of 148.5 MHz and 166 MHz. An enable signal shown in E of FIG. 10 is set to be "0" for the periods after the period in which the same pixel data is arranged when the same pixel data is consecutively read.

F to H of FIG. 10 show another example in which the clock conversion unit 111 performs clock conversion. F to H of FIG. 10 show examples of three timings at which the buffer 111b performs output. In other words, from output image data shown in F of FIG. 10, output image data shown in G of FIG. 10 is delayed by one clock period. Further, output image data shown in H of FIG. 10 is delayed by two more clock periods from the output image data shown in F of FIG. 10. For example, as the buffer 111b outputs image data in the state shown in F of FIG. 10, it is possible to avoid having a timing at which two consecutive readings of the pixel data D2 take place.

J to L of FIG. 10 are a processing example when the clock conversion unit 221 of the output unit 13 converts the clock frequency of 166 MHz of the output image data of the three timings into the clock frequency of 148.5 MHz. I of FIG. 10 shows the clock frequency of 148.5 MHz for reading.

When image data of the timing of F of FIG. 10 is received, each piece of the pixel data D1, D2, D3, . . . is read from the clock conversion unit 221 as shown in J of FIG. 10. Pieces of image data of the timings of K and L of FIG. 10 are each delayed by one clock period.

In this manner, at any timing, it is necessary in the output unit 13 to extract the pieces of the pixel data D1, D2, D3, . . . as consecutive pieces of image data.

FIG. 11 is an example in which the clock conversion unit 221 of the output unit 13 sets reading timings of the image data from the buffer 221b with reference to a synchronization signal.

As illustrated in A, B and C of FIG. 11, image data is assumed to be supplied to the clock conversion unit 221 in synchronization with the clock frequency of 166 MHz. For example, the image data is assumed to be received at the timing shown in B of FIG. 11.

In this case, the clock conversion unit 221 reads the image data in synchronization with the clock frequency of 148.5

MHz shown in D of FIG. 11, however, the clock conversion unit decides a reading timing with reference to a synchronization reference signal shown in E of FIG. 11 and reads image data as shown in F of FIG. 11.

By reading data using the synchronization signal in this manner, the clock conversion unit 221 can read image data at an appropriate timing.

3. Modified Example

In the embodiments described above, application of the imaging device has been exemplified. With regard to this, the processes and configurations described in each of the embodiments may be applied to another information processing device that performs processing of image data.

In addition, the transfer rates and formats of image data described in each of the embodiments are mere examples, and other transfer rates and formats may be applied.

Additionally, the present technology may also be configured as below.

(1)

An information processing device including:

N first clock conversion units (N is an integer) that convert image data as parallel data into image data having a specific clock cycle;

a serial conversion unit that converts N pieces of the image data converted by the first clock conversion units into one-system serial data and outputs the converted data;

a parallel conversion unit to which the image data converted by the serial conversion unit is input and that converts the data into N pieces of parallel data having a predetermined number of bits;

a synchronized data generation unit that generates synchronized data of the image data; and N second clock conversion units that reconvert the N pieces of image data converted by the parallel conversion unit to an original clock cycle from the specific clock cycle and set the clock cycle of the converted image data to be in a phase in synchronization with the synchronized data generated by the synchronized data generation unit.

(2)

The information processing device according to (1), wherein the first clock conversion units add an enable signal indicating a valid period of the image data having the specific clock cycle to image data, and wherein the second clock conversion units extract the image data of the period indicated to be valid by the enable signal added to the image data, and convert the image data so as to have the original clock cycle.

(3)

The information processing device according to (2), wherein the first clock conversion units set image data having M+1 bits (M is an integer) by adding the enable signal to the parallel data having M bits.

(4)

The information processing device according to any one of (1) to (3), wherein the N pieces of image data supplied to the N first clock conversion units are image data obtained by dividing one piece of image data into N pieces.

(5)

The information processing device according to any one of (1) to (3), wherein the N pieces of image data supplied to the N first clock conversion units are image data of which each piece has a different format.

(6)

The information processing device according to (5), wherein the N pieces of image data having different formats are image data of which each piece has a different number of pixels.

(7)

The information processing device according to any one of (1) to (6), wherein the synchronized data generated by the synchronized data generation unit is synchronized data of a timing synchronized with a reference signal input from an outside of the information processing device.

(8)

An imaging device including:

an imaging unit;

N first clock conversion units (N is an integer) that are supplied with image data imaged and obtained by the imaging unit as parallel data and convert the image data as parallel data into image data having a specific clock cycle;

a serial conversion unit that converts N pieces of the image data converted by the first clock conversion units into one-system serial data and outputs the converted data;

a parallel conversion unit to which the image data converted by the serial conversion unit is input and that converts the image data into N pieces of parallel data having a predetermined number of bits;

a synchronized data generation unit that generates synchronized data of the image data;

N second clock conversion units that reconvert the N pieces of image data converted by the parallel conversion unit to an original clock cycle from the specific clock cycle and set the clock cycle of the converted image data to be in a phase in synchronization with the synchronized data generated by the synchronized data generation unit; and an output unit that outputs the image data converted by the second clock conversion units.

(9)

An information processing method including:

converting N pieces (N is an integer) of image data as parallel data into image data having a specific clock cycle;

converting the N pieces of image data having the specific clock cycle into one-system serial data;

converting the N pieces of image data converted into the serial data into N pieces of parallel data having a predetermined number of bits; and reconverting the N pieces of parallel data having the predetermined number of bits to an original clock cycle from the specific clock cycle and setting the clock cycle of the converted image data to be in a phase in synchronization with synchronized data.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:

N first clock conversion units configured to convert N pieces of image data as parallel data into image data having a specific clock cycle, wherein N is an integer, and wherein the N pieces of image data supplied to the N first clock conversion units are image data of which each piece has a different display format;

a serial conversion unit configured to convert the N pieces of the image data converted by the first clock conversion units into system serial data and output the converted serial data;

a parallel conversion unit, to which the image data converted by the serial conversion unit is input, configured to convert the image data converted by the serial conversion unit into N pieces of parallel data, wherein each piece of the N pieces of parallel data includes a number of bits;

a synchronized data generation unit configured to generate synchronized data of the image data; and N second clock conversion units configured to reconvert the N pieces of image data converted by the parallel conversion unit to an original clock cycle from the specific clock cycle and set a clock cycle of the reconverted image data to be in a phase in synchronization with the synchronized data generated by the synchronized data generation unit.

2. The information processing device according to claim 1, wherein the first clock conversion units are configured to add an enable signal indicating a valid period of the image data having the specific clock cycle to the image data, and wherein the second clock conversion units are configured to extract the image data of the period indicated to be valid by the enable signal added to the image data, and reconvert the image data so as to have the original clock cycle.

3. The information processing device according to claim 2, wherein the first clock conversion units are configured to set image data having M+1 bits by adding the enable signal to the parallel data having M bits, wherein M is an integer.

4. The information processing device according to claim 1, wherein the N pieces of image data supplied to the N first clock conversion units are image data obtained by dividing one piece of image data into N pieces.

5. The information processing device according to claim 1, wherein the N pieces of image data having different formats are image data of which each piece has a different number of pixels.

6. The information processing device according to claim 1, wherein the synchronized data generated by the synchronized data generation unit is synchronized data of a timing synchronized with a reference signal input from an outside of the information processing device.

7. An imaging device comprising:

an imaging unit;

N first clock conversion units configured to be supplied with N pieces of image data imaged and obtained by the imaging unit as parallel data, configured to convert the N pieces of the image data as parallel data into image data having a specific clock cycle, wherein N is an integer, and wherein the N pieces of image data supplied to the N first clock conversion units are image data of which each piece has a different display format;

a serial conversion unit configured to convert the N pieces of the image data converted by the first clock conversion units into system serial data and outputs the converted serial data;

a parallel conversion unit, to which the image data converted by the serial conversion unit is input, is configured to convert the image data converted by the serial conversion unit into N pieces of parallel data, wherein each piece of the parallel data includes a number of bits;

a synchronized data generation unit configured to generate synchronized data of the image data;

N second clock conversion units configured to reconvert the N pieces of image data converted by the parallel conversion unit to an original clock cycle from the specific clock cycle and set a clock cycle of the reconverted image data to be in a phase in synchronization with the synchronized data generated by the synchronized data generation unit; and an output unit configured to output the image data converted by the second clock conversion units.

* * * * *